Nov. 13, 1923.

G. KALENOFF

CUTTING MACHINE

Filed July 16, 1923

1,473,629

Inventor:
Godel Kalenoff,
his Attorneys.

Patented Nov. 13, 1923.

1,473,629

UNITED STATES PATENT OFFICE.

GODEL KALENOFF, OF ST. LOUIS, MISSOURI.

CUTTING MACHINE.

Application filed July 16, 1923. Serial No. 651,796.

*To all whom it may concern:*

Be it known that I, GODEL KALENOFF, a citizen of the United States, and a resident of the city of St. Louis, and State of Missouri, have invented a new and useful Improvement in Cutting Machines, of which the following is a specification.

My invention relates to cutting machine and has for its principal object a machine for cutting or slicing bread, cheese, and other articles, that is simple in construction and easy to operate and that makes a clean cut.

The invention consists principally in mounting the knife in a yoke member that is suspended from a rotary disk, whereby the knife is given a combined oscillating and reciprocating movement. The invention further consists in the parts and combinations of parts hereinafter described and claimed.

Figure 1:
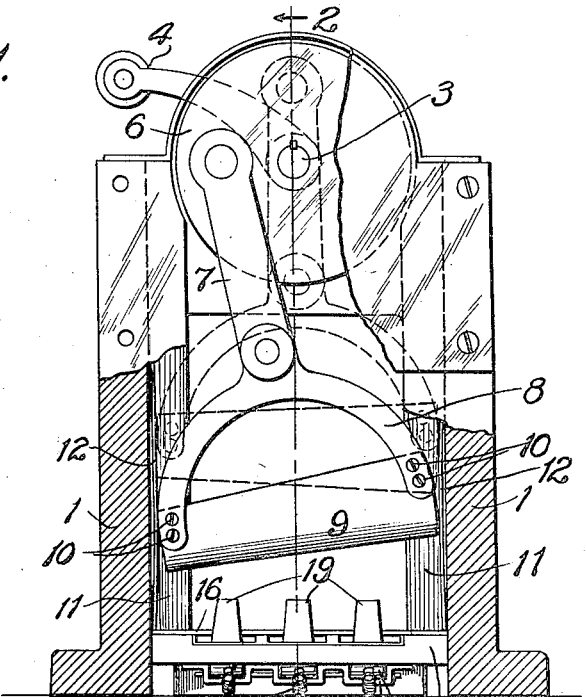
Figure 2:
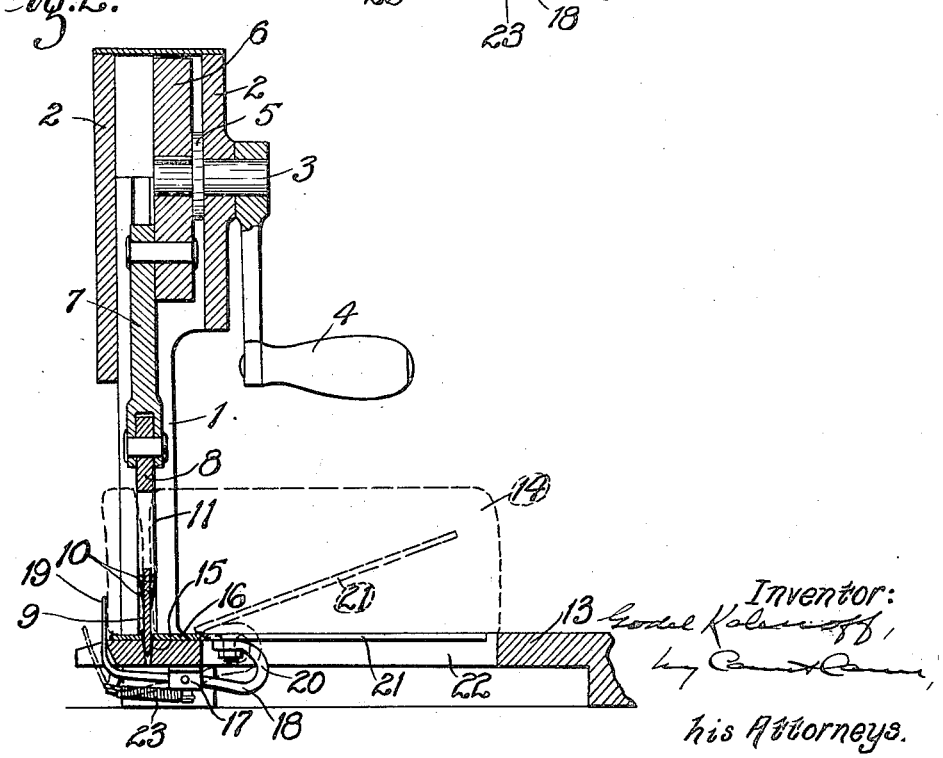

In the accompanying drawing,

Fig. 1 is an elevation of cutting machine embodying my invention, portions of the supporting standards being shown in section; and Fig. 2 is a vertical section on the line 2—2 in Fig. 1.

A pair of standards 1 are secured together, as by plates 2 secured to their upper ends. A shaft 3 is rotatably mounted in one of said plates and is provided with a handle 4 for turning it. Mounted on the shaft 3 and preferably spaced away from the plate by a washer 5, is a disk 6 to which is pivotally secured an arm 7, the disk constituting a crank arm whereby the rotary movement of the shaft is changed to a combined reciprocating and rotary movement.

Secured to the end of said arm 7 is a substantially semi-circular yoke member 8 to the ends of which is secured a knife 9 as by screws 10. The ends of the yoke member and knife are disposed in alined slots 11 in the standards 1. In each slot 11 is a flat spring 12 that bears against the yoke member and serves as a resilient guide therefor.

A base or table 13 on which a loaf of bread 14 or other article may be placed to be cut is disposed between the lower ends of standard 1. The base is provided with a slot 15 into which the knife 9 extends to the end of its cutting stroke as shown in Fig. 2. On each side of the slot 15 the base may be protected by metal strips 16.

Pivotally secured to suitable supports 17 on the underside of the base near the slot are arms 18. Each arm 18 has a finger 19 that projects upwardly at the end of the base, constituting a limit stop for the end of the article 14 to be cut. The other end of each arm 17 is provided with a rebent hook portion 20 to which is secured an elongated strip 21 that rests in a longitudinal slot 22 in the base. Secured to each arm 17 and to the base 13 of the machine is a spring 23 that tends to keep the arm in the position shown in dotted lines in Figure 2, in which the stop fingers 18 are swung downwardly, away from the knife so that the cut slice may fall out of the machine, and the elongated strips are disposed upwardly. When the article is placed in the machine to be cut it forces down the elongated strips and forces up the stop fingers in position to engage the article.

The handle 4 may be removed, if desired and the shaft 3 be driven by any suitable source of power.

The hereinbefore described cutting machine has numerous advantages. It is simple and easy to operate and to keep clean. The knife is given a combined oscillating and reciprocating movement so that it slices the article after the fashion of a manually operated knife, instead of shearing it, Obviously numerous changes may be made without departing from the invention and I do not wish to be limited to the precise construction shown.

What I claim is:

1. A cutting machine comprising a rotary disk, a yoke member suspended therefrom, a knife secured at its ends to the ends of said yoke and guideways for the ends of said yoke member.

2. A cutting machine comprising a rotary disk, a yoke member suspended therefrom, a knife secured at its ends to the ends of said yoke and guideways for the ends of said yoke member and resilient members in said guideways bearing against said yoke member.

3. A cutting machine comprising a pair of standards having alined longitudinal slots therein, a knife support having its ends disposed in said slots, a knife secured to said knife support, means for moving said knife in said slots and a spring disposed in each of said slots and bearing against the ends of said knife support and knife.

4. A cutting machine comprising a pair of standards having alined longitudinal slots therein, a plate connecting the upper ends of said standards, a shaft rotatably mounted in said plate, a disk secured to said shaft, an arm pivotally secured to said disk near its edge, a yoke member secured to said arm, and a knife secured to the ends of said yoke member, the ends of said yoke member and said knife resting in said slots.

5. A cutting machine comprising a pair of standards having alined longitudinal slots therein, a plate connecting the upper ends of said standards a shaft rotatably mounted in said plate, a disk secured to said shaft, an arm pivotally secured to said disk near its edge, a yoke member secured to said arm, a knife secured to the ends of said yoke member, the ends of said yoke member and said knife resting in said slots, and a spring disposed in each of said slots and bearing against said yoke member and knife.

6. In a cutting machine, a base, a knife, an arm pivotally secured to the base and having a finger projecting upwardly beyond the base to constitute a stop for the article being cut, an elongated strip secured to the other end of said arm and a spring secured to said arm and to the base and adapted to swing the stop finger downwardly away from the knife, whereby the stop finger may be swung upwardly into position to act as a stop by placing the article to be cut on said elongated strip.

Signed at St. Louis, Missouri, this 11th day of July, 1923.

GODEL KALENOFF.